United States Patent [19]

Rolls et al.

[11] 4,239,679

[45] Dec. 16, 1980

[54] HIGH BULK DENSITY RIGID POLY(VINYL CHLORIDE) RESIN POWDER COMPOSITION AND PREPARATION THEREOF

[75] Inventors: James A. Rolls, Painesville; Kenneth L. Brenis, South Euclid, both of Ohio

[73] Assignee: Diamond Shamrock Corporation, Dallas, Tex.

[21] Appl. No.: 52,458

[22] Filed: Jun. 27, 1979

[51] Int. Cl.$^3$ ............................................. C08K 3/26
[52] U.S. Cl. ......................... 260/42.49; 260/23 XA; 260/23 R; 260/28.5 C; 260/42.44; 260/45.75 S
[58] Field of Search ............ 260/42.49, 42.44, 23 XA, 260/23 R, 28.5 C, 45.75 S

[56] References Cited

U.S. PATENT DOCUMENTS

| | | | |
|---|---|---|---|
| 3,567,669 | 3/1971 | Georgiana et al. | 260/23.7 R |
| 3,775,359 | 11/1973 | Georgiana et al. | 260/23.7 R |

*Primary Examiner*—Melvyn I. Marquis
*Attorney, Agent, or Firm*—Helen P. Brush

[57] ABSTRACT

Completely free flow characteristics are provided to a densified rigid poly(vinyl chloride) resin powder composition as prepared in a high shear mixer at an elevated temperature, by withholding at least a portion of the total filler requirement from the composition during the initial mixing cycle, and thereafter adding the remainder of the filler requirement to the composition after it has been cooled to a temperature of 175° F. or less. The total filler requirement of the composition may likewise be added after cooling the blend to 175° F. or less. The resulting rigid resin powder composition exhibits the optimum free flow characteristics required for satisfactory processing in multi-screw extruders.

8 Claims, No Drawings

HIGH BULK DENSITY RIGID POLY(VINYL CHLORIDE) RESIN POWDER COMPOSITION AND PREPARATION THEREOF

BACKGROUND OF THE INVENTION

The present invention relates to an improved rigid resin powder composition prepared from suspension polymerized poly(vinyl chloride) resin (PVC). This composition which is prepared at substantially elevated temperatures is defined as "densified" in that it has a high bulk density compared to similar PVC powder formulations prepared at moderately elevated temperatures. Further, this invention relates to the method for preparing a densified PVC powder composition which will exhibit optimum processing characteristics in multi-screw extrusion operations.

Resin powder compositions incorporating suspension polymerized PVC have enjoyed widespread usage for many years. As initially developed in the art, these materials, which now are commonly known as "dry blends" or "powder blends," were prepared, for the most part, in blade-type mixers at low shear rates and with the application of heat. More recently, such dry blends have been prepared in high shear mixers wherein the heat necessary for intimate blending of the compounded ingredients is generated within the mixer by friction between impinging resin particles or from contact of the resin particles with metal components in the mixer. By using either the low or high shear mixing method, the maximum temperature attained during the dry blending process usually varies between 180° and 260° F., depending upon the particular formulation prepared.

In U.S. Pat. Nos. 3,567,669 and 3,775,359, issued on Mar. 2, 1971, and Nov. 27, 1973, respectively, there is described and claimed a more efficiently processed rigid PVC powder composition and its preparation. This formulation is prepared in a high shear mixer to a maximum blending temperature of 340°–425° F. Exhibiting a higher bulk density than the earlier dry blends, it may be processed at an accelerated rate in various types of processing equipment to prepare high quality extruded and molded plastic articles. However, when formulated and applied in some processing equipment, e.g., in multi-screw extruders, the compositions prepared according to the aforesaid patent teachings do not consistently give satisfactory results. Oftentimes, these materials tend to bridge in the extruder hopper and exhibit feeding problems, thus exhibiting less than the required free flow characteristics for satisfactory performance in multi-screw extrusion equipment.

SUMMARY OF THE INVENTION

It has now been found that a completely free flowing densified PVC powder composition adapted to optimum processing in multi-screw extruders may be prepared by the high shear mixing procedure essentially as taught in U.S. Pat. No. 3,567,669, but with the distinction that from about 20 percent to 100 percent of the total filler requirement is withheld from the composition until after it has been blended and then cooled to 175° F. or less in the cooling chamber. The resulting composition, even if containing high levels of wax, exhibits completely free flowing characteristics with no evidence of "tack" or "static buildup." It may be processed at optimum rates in multi-screw extruders with no powder feeding problems.

DESCRIPTION OF THE PREFERRED EMBODIMENTS

As used herein in the specification and claims, the terms "rigid poly(vinyl chloride) powder composition," "rigid PVC powder composition" or "rigid PVC resin powder composition" are each intended to refer to those compositions wherein a poly(vinyl chloride) resin prepared by a suspension-type polymerization process is in intimate physical admixture with minor quantities of various modifying ingredients as described hereinafter. In practice herein, these modifying ingredients do not usually include organic liquids, which are designated in the art as plasticizers. However, for some specialized applications, the rigid resin composition may contain minor quantities of organic liquid plasticizers, such quantity not exceeding 10 percent based on the weight of the composition, so as not to degrade the strength and resistance properties of the resin. It is to be understood, therefore, that a rigid resin composition which contains up to 10 percent, by weight, of an organic liquid plasticizer, although not regularly employed in practice herein, is within the scope of the present invention.

As indicated previously herein, the present invention encompasses a densified rigid PVC powder composition particularly adapted to processing in multi-screw extrusion equipment, and especially the method for preparing this composition whereby distinctive free flow characteristics are imparted thereto. The composition itself comprises an intimate physical blend of a major amount of a particulate, suspension-polymerized poly(vinyl chloride) resin and minor amounts of various selected ingredients such as are commonly used in poly(vinyl chloride) resin compositions to enhance thermal stability of the resin, to improve or modify processing characteristics of the composition and/or to impart certain physical properties to articles fabricated therefrom. These selected ingredients include stabilizers, resinous impact modifiers, resinous processing aids for the polymer, lubricants, fillers or extenders, pigments and colorants. The mixing apparatus employed herein is a high shear, jacketed mixer of the type used heretofore to prepare resin powder compositions. A mixer of this type is equipped with high-speed agitation means whereby the charged ingredients can be rapidly recirculated by centrifugal action or other similar force at high velocity and with concurrent intensive particle-to-particle and particle-to-metal impingement. Due to the intensive mixing action and the said particle impingement, large amounts of kinetic energy dissipated in the blended material are converted to heat energy which is rapidly and uniformly generated within the material by friction. In practice herein, no external heat is applied as a rule to the blended ingredients in the mixer, the necessary heat being developed completely within the blend by friction. However, external heat may be applied to the blending ingredients through the mixer jacket without departing from the scope of this invention.

Any high shear, high-speed mixer which is commercially available at present may be suitably employed to prepare the densified rigid poly(vinyl chloride) resin powder composition provided intimate dispersion can be effected therein in an extremely short blending cycle with the desired degree of densification in the composition. Suitable commercial high-speed mixers are enumerated in U.S. Pat. No. 3,567,669, the disclosure of which is incorporated herein by reference. Of these, the Henschel "Fluid Mixer" (Prodex Corp., Fords, New Jersey) and the "Papenmeier Universal Dry Mixer" (distributed in the U.S. by Welding Engineers, Inc., Norristown, Pa.) are preferred at present. The Littleford High Speed Mixer, manufactured by Littleford Brothers, Inc., Florence, Kentucky, is also suitable.

The PVC resins utilized herein are, as previously mentioned, prepared by conventional aqueous suspension polymerization techniques and have, in general, a relative viscosity ranging from about 1.70 to 3.25 and a bulk density ranging from about 0.33 g/cc to about 0.62 g/cc. In presently preferred embodiments herein, resins having a relative viscosity within the range of about 1.70 to 3.00 and a comparable K-value of about 52–84, are employed. The relative viscosity value is determined herein at 25° C., employing a one-percent solution of the polymer in cyclohexanone. The K-value is determined at 25° C., using a 0.5 g/100 ml solution of the polymer in cyclohexanone.

Stabilizers which may be incorporated in the powder compositions of this invention are as disclosed in U.S. Pat. No. 3,567,669. Thus, stabilizers suitably employed include metallic soaps, e.g., the stearates, laurates, recinoleates of calcium, barium, lead, magnesium, etc., alkyl tin salts; organic esters of phosphorus acid; organic metal compounds which contain at least one metal-S linkage, e.g., tin mercaptides, or the thioglycollates of tin or antimony, including the reverse ester mercaptides thereof; inorganic lead salts; and organic esters or salts containing complexed metals such as barium, cadmium, calcium, antimony or zinc. These compounds may be incorporated either singly or in combination in the formulation. As also disclosed in the aforesaid patent, from about 0.10 to 7 parts of stabilizer in the composition for each 100 parts of resin, by weight, generally is sufficient to provide satisfactory heat and light stability.

Depending upon the end use application of the composition, it may or may not contain a resinous compound which serves as an impact modifier for providing good impact to the articles fabricated therefrom. As needed, however, there may be incorporated in the composition a minor amount of one or more such resinous impact modifiers, typically in an amount ranging from about 0.5 up to about 20 percent of the resin content of the composition. Suitable modifying agents which may be employed have been disclosed in U.S. Pat. No. 3,567,669, which disclosure is incorporated herein by reference. It is to be noted, however, that, as presently practiced, acrylic polymers, chlorinated polyethylene, ethylene-vinyl acetate copolymers, and the terpolymers of acrylonitrile, butadiene and styrene and of methyl methacrylate, butadiene and styrene are the preferred modifying ingredients in the composition of this invention.

Further, materials may be incorporated in the composition as lubricants for the resin for providing slip, antisticking and die-releasing properties to the composition during processing. Suitable such compounds include monobasic fatty acids containing from about 12 to 18 carbons per molecule, metallic salts of such monobasic fatty acids, and their ester waxes in partially saponified ester waxes, organic liquids containing epoxy groups; and various naturally occurring and synthetic hydrocarbon derivatives, such as, for example, low molecular weight polyethylene and oxidized polyethylene, waxes, mineral oils or glycerin. Any of these ingredients, used singly or in combinations of two or more, are typically incorporated in a total amount ranging from about 0.1 part up to 5 parts for each 100 parts of resin used, by weight. For convenience, these lubricants are generally designated herein as "nonresinous" ingredients.

Compounds which typically are of resinous composition oftentimes are advantageously incorporated into the resin blend as processing aids therefor. These components serve to improve the hot melt properties of the composition as it is processed at extremely high shear rates. Suitable such compounds are enumerated in U.S. Pat. No. 3,567,669, the disclosure of which is incorporated herein by reference. Included are, e.g., various copolymers and terpolymers of alkyl esters of acrylic and methacrylic acids and poly(alpha-methyl styrene). When employed, processing aid components typically will be used in an amount ranging from 0.25 to about 5 parts per each 100 parts of resin.

Other ingredients incorporated in the composition include fillers, for example, calcium carbonates or silicates, silicon dioxide, whitings and the like, and pigments, such as titanium dioxide. These materials generally may be employed in amounts ranging from about 0.1 to 20 parts per 100 parts of resin.

In general, the densified rigid poly(vinyl chloride) resin powder composition of this invention is prepared in a high shear mixer essentially as set forth in U.S. Pat. No. 3,567,669. In the practice of this invention, however, the formulated components are blended to a maximum mix temperature of about 360° F. rather than the maximum mix temperature of 425° F. which is taught in the patent. A maximum temperature of 360° F. is employed so that the free flow characteristics of the composition are not deleteriously affected. At 360° F., however, the selected resin-modifying ingredients incorporated in the composition still are homogeneously absorbed and/or adsorbed by the resin particles so that an intimate dispersion of stabilizer, processing aid, lubricant, etc., is attained within the resin particles. Further, no substantial resin agglomeration develops in the composition during the mix cycle, although its bulk density is desirably increased.

In preparing the composition, the sequence in which the additives are blended with the resin is not especially critical and generally may be accomplished in any convenient manner. For example, in a typical batch-type mixing operation, the resin and one or more of the other ingredients, usually the stabilizer, are added to the mixer at ambient temperature. These components are then blended together until the temperature of the mix is raised to at least 170° F. Thereafter, the impact modifier, pigment, lubricant, resinous processing aid and any of the filler component to be incorporated are added while mixing is continued to the desired discharge temperature, which is within the range of about 320°–360° F., depending upon the formulation prepared.

Upon reaching the desired discharge temperature, the blended composition is transferred from the high shear mixing chamber to the cooling vessel. When the blend has then been cooled therein with continued agitation to a temperature of 175° F., the filler requirement or any remaining portion thereof not added during the mixing cycle is incorporated into the composition. Mixing of the blended material is continued in the cooling chamber until the temperature of the blend has been further reduced, e.g., to 110° F., before removal from the cooling vessel.

In general, fillers having an average particle size of 10 microns or less will provide the desired free flow properties to the prepared composition. In particular, those compositions incorporating very fine fillers, i.e., those having an average particle size of 0.1 micron or less, presently exhibit the fastest free flow characteristics.

As indicated previously, only a portion or none of the filler requirement of the composition is incorporated during the initial mixing operation in accordance with this invention. In practice, from 0 percent to about 80 percent of the filler requirement generally is added during the high shear mixing cycle, with from about 20 percent to 100 percent of said total filler requirement being incorporated into the composition after it has been cooled to a temperature no greater than 175° F. in the cooler. If a portion of the filler requirement is added during the mixing operation, this amount typically ranges from 25-80 percent of the total filler requirement depending upon the formulation being prepared, with an amount of 40-60 percent of the total being presently preferred. In such instances, the remaining portion of the filler requirement is incorporated when the temperature of the composition has been reduced to 175° F. maximum in the cooler. In present practice, it is preferred to add the remaining filler requirement when the composition has been cooled to a temperature of 150° F. or less.

The densified, rigid PVC powder composition in accordance with this invention, by virtue of its higher bulk density and improved flow characteristics, may, of course, be processed at much faster rates than prior rigid PVC powder compositions prepared conventionally at, e.g., 180°-290° F. Although it may not be processed usually at much faster rates than the densified powder composition according to U.S. Pat. No. 3,567,669, the composition of this invention nevertheless possesses the free flow characteristics which make it singularly adapted to satisfactory processing in multi-screw extruders and in other processing equipment wherein the earlier densified composition does not consistently yield quality products. It is to be understood, of course, that the improved densified composition of this invention may be processed like the composition of the patent, utilizing the same equipment, with optimum results.

By selecting a base resin component of the proper bulk density, it is possible to prepare herein a densified composition with a bulk density which will provide, in combination with its free flow characteristics, economical, commercially feasible production rates for any particular extruder. During processing, the composition does not bridge in the hopper or exhibit other feeding problems, nor does it cause problems with vent flow, power or back pressure. It is particularly adapted for the fabrication of high quality finished articles on multi-screw machines, although containing extremely high wax levels. Typical products include DWV pipe, sewer pipe, potable water pipe, irrigation piping and telephone ducting.

In order that those skilled in the art may more completely understand the present invention and the preferred methods by which the same may be carried into effect, the following specific examples are offered. In these examples and elsewhere herein where proportions of ingredients may be described in parts, such proportions are by weight.

Example 1

A rigid PVC resin powder composition according to this invention was blended in a two-stage, high shear mixer (Henschel Mixer, Prodex Model 35JSS, with a total capacity of 45.4 kilograms). The suspension polymerized PVC employed had a bulk density of 0.50 g/cc and a relative viscosity of 2.36, determined at 30° C., using a one-percent solution of the polymer in cyclohexanone.

The formulation blended was as follows:

| PVC | 100 parts, by wt. |
| --- | --- |
| Tin mercaptide stabilizer[1] | 0.3 |
| 165° F. melting wax | 1.4 |
| Calcium carbonate | 1.5 |
| Titanium dioxide | 1.0 |
| Calcium stearate | 0.6 |
| Oxidized polyethylene[2] | 0.1 |

[1]TM 692-Cincinnati Milacron
[2]AC629A-Allied Chemical Co.

The resin and stabilizer were charged to the mixer at ambient temperature and the mixing cycle started. When the temperature of the mixture reached 180° F., the wax, calcium carbonate (60 percent of the total filler requirement), titanium dioxide, calcium stearate and polyethylene components were added. The average particle size of the calcium carbonate filler was 3.0 u. When the blend temperature reached 340° F., the mixture was discharged into the cooling chamber wherein it was cooled with agitation to 150° F. The remaining portion of filler to be added (one part calcium carbonate per each 100 parts resin) was then incorporated and the agitating mixture was further cooled to 120° F. before removal from the cooling chamber. This material is designated hereinbelow as Sample A.

For comparison purposes, another formulation was prepared as set forth above, except that the total amount of calcium carbonate employed (2.5 parts per each 100 parts resin, by weight) was incorporated during the initial blending cycle. This composition, designated below as Sample B, was likewise cooled to 120° F. before discharge from the cooling chamber.

After storage for approximately 40 hours, the bulk density of each composition was determined according to ASTM Standard Procedure D-1895 (Method A) as follows: A funnel, having a 9.5 mm diameter opening at the bottom was mounted 38 mm above a cylindrical, weighed measuring cup of 100±0.5 cc capacity, having an inside diameter of 39.9 mm and an inside height of 79.8 mm. The bottom opening of the funnel was closed and a 115±5—cc sample of the composition was poured into the funnel. The bottom was quickly opened, allowing the material to flow into the cup. After all the sample had passed through the funnel, the excess was scraped off the top of the cup without disturbing the cup. The cup and contents were weighed to the nearest 0.1 g, the weight of the collected composition was obtained by difference, and its weight in grams/cc was then calculated.

The pourability of each composition was determined according to ASTM D-1895 as follows: The funnel described above was mounted. A sample of composition weighing, in grams, 100 times its apparent density was worked on a paper until there was no tendency for the material to cake or pack. After closing the bottom opening of the funnel, the sample of the material was poured lightly into the funnel and the bottom of the funnel was then opened. The side of the funnel was tapped gently as many times as was necessary to start flow of the material. The timer was started the instant that the material started to discharge from the funnel. When the last of the sample had left the funnel, the timer was stopped. The pourability, i.e., flow time of the material is the time in seconds required for the funnel to discharge completely.

Using these procedures, the following results were obtained:

TABLE 1

| Sample | Bulk Density g/cc | Pourability Flow Time sec | Taps* |
|---|---|---|---|
| 1A | 0.624 | 9.7 | 3 |
| 1B | 0.608 | 12.4 | 7 |

*Number of times funnel tapped to start flow of composition.

EXAMPLES 2-7

Following the same mixing procedure and formulation outlined in the previous example, a series of rigid PVC resin compositions were prepared employing fillers of varying average particle size. For each blend, 60 percent of the filler requirement (1.5 parts per 100 parts resin, by weight) was added in the mixing cycle, the remaining 40 percent (1.0 part) being added when the temperature of the blended material was reduced to 150° F. in the cooling chamber.

After storage for approximately 40 hours, the apparent density and pourability of each prepared composition was determined as outlined previously. The results obtained are listed in the following table which includes the results obtained for Samples 1A and 1B of Example 1.

TABLE 2

| Example | Filler | Aver. Part. Size μ | Bulk Density g/cc | Pourability Flow Time sec | Taps |
|---|---|---|---|---|---|
| 2 | CaCO3 | 2.5 | 0.628 | 12.8 | 3 |
| 3 | CaCO3 | 5.0 | 0.626 | 10.6 | 2 |
| 4 | CaCO3 | 1.2 | 0.618 | 11.7 | 5 |
| 5 | CaCO3 | 0.7 | 0.631 | 9.6 | 2 |
| 6 | SiO2 | 0.02 | 0.709 | 6.0 | 0 |
| 7 | Sodium Silicate Aluminate | 0.04 | 0.659 | 6.3 | 0 |
| 1A | CaCO3 | 3.0 | 0.624 | 9.7 | 3 |
| 1B | CaCO3* | 3.0 | 0.608 | 12.4 | 7 |

*Total CaCO3 requirement added during initial mixing cycle

Examination of the above results shows that compared to the conventionally prepared material (Example 1B), the pourability and/or the free flow characteristics of the densified composition are improved according to this invention by withholding a portion of the filler requirement from said composition until it has been significantly cooled from the mixing temperature of 340° F. In addition to its flow time, the comparative free flow characteristics are gauged by the number of taps of the test funnel required to start flow of the composition.

EXAMPLES 8-12

The following powder composition was blended using the PVC resin and the blending equipment described in Example 1:

| PVC | 100 parts, by weight |
|---|---|
| Tin mercaptide stabilizer[1] | 0.3 |
| 165° F. wax | 1.35 |
| Calcium carbonate | 2.5 |
| Titanium dioxide | 1.0 |
| Calcium stearate | 0.4 |
| Oxidized polyethylene[2] | 0.1 |
| Acrylic modifier[3] | 0.5 |

[1,2]As described previously
[3]K-120-N-Rohm and Haas

The resin and stabilizer were charged to the mixer and the mixing cycle started. When the temperature of the mixture reached 180° F., all other materials were added. When the blend temperature reached 340° F., the mixture was discharged into the cooling chamber wherein it was cooled with agitation to 150° F. This material is designated herein below as the product of Example 8.

Additional blends were prepared similarly, except that a portion of the calcium carbonate was withheld and added in the cooling chamber. The amount added in the cooling chamber and the temperature at addition is given in the following table:

TABLE 3

|  | Example | | | |
|---|---|---|---|---|
|  | 9 | 10 | 11 | 12 |
| CaCO3, phr* | 0.5 | 1.0 | 1.0 | 1.0 |
| Cooler temp., °F. | 110 | 110 | 125 | 150 |

*parts per hundred parts of resin, by weight

These powder blends were then extruded on a Cincinnati Milacron A2/80 twin screw extruder into 2" Schedule 40 pipe. The following table describes the blends and the results of the extrusion runs:

TABLE 4

| | Example | | | | |
|---|---|---|---|---|---|
| | 8 | 9 | 10 | 11 | 12 |
| Powder Product Properties | | | | | |
| Bulk density, g/cc | 0.58 | 0.61 | 0.62 | 0.61 | 0.61 |
| Funnel flow, sec. | — | 10.3 | 9.6 | 9.9 | 12.0 |
| Funnel flow, character | non-free-flowing | ← free flowing → | | | |
| Processing Behavior | | | | | |
| Hopper flow | very poor | ← excellent flow → | | | |
| Hopper bridging | yes | ← no → | | | |
| Hand | wet | ← dry → | | | |

These results show that by incorporating the filler requirement in the composition in accordance with this invention (Examples 9-12), the powder products prepared are completely free flowing. They are discharged through the test funnel with no funnel taps needed to initiate flow.

EXAMPLE 13

This example further illustrates the improved extrusion performance exhibited by the composition of this invention compared to that of a conventional multi-screw pipe compound under similar processing conditions (motor speed is 2450 rpm in both cases). Using a CM 111 extruder with an AK-4 Head, the conventional composition was processed satisfactorily at a rate of 358.3 kilograms/hour. The composition of this invention produced good quality pipe at a rate of 440.4 kilograms/hr, an increase of 23 percent over that of the conventional composition.

EXAMPLES 14 and 15

Two additional powder compositions were prepared according to this invention wherein all of the filler component was withheld until the blended composition was cooled to a temperature of 150° F. in the cooler. The mixing procedure and the formulation used were as outlined in Example 1 except that no filler was added during the initial mixing cycle. One composition contained 1.5 parts calcium carbonate per 100 parts resin, by weight, while the second composition incorporated 2.5 parts calcium carbonate per 100 parts resin, by weight.

After storage for approximately 24 hours, the bulk density and pourability of each composition were determined according to ASTM Standard Procedure D-1895 as described in Example 1. The results obtained were as follows:

TABLE 5

| Example | Parts Ca CO$_3$ phr[1] | Bulk Density g/cc | Pourability Flow Time Sec | Taps[2] |
|---|---|---|---|---|
| 14 | 1.5 | 0.65 | 8.6 | 1 |
| 15 | 2.5 | 0.65 | 9.0 | 2 |

[1]phr = per hundred parts resin, by weight
[2]Times funnel is tapped to start flow of composition The composition of Example 14 was extruded on the Cincinnati Milacron A2/80 twin screw extruder into 2" Schedule 40 pipe at a rate of 104.4 kilograms/hours. The finished pipe was of excellent quality, with a smooth glossy surface throughout.

What is claimed is:

1. In a method for preparing a densified rigid poly(vinyl chloride) resin powder composition which comprises blending together a particulate, suspension-polymerized poly(vinyl chloride) resin and, based on the weight of the resin, from 0.10 to 7 percent of a heat stabilizer therefor, from 0–20 percent of resinous impact modifier, from 0.1–5 percent of nonresinous lubricant, from 0 to about 5 percent of resinous processing aid and from 0.1–20 percent of filler in a high shear mixing apparatus until the temperature of the blending mixture is raised by frictional heat to a temperature ranging from 320°–360° F. prior to removing the blended composition from the mixing apparatus and subsequently cooling said composition with agitation, the improvement which comprises adding from 0 percent to about 80 percent of the total filler requirement to the blending composition during the high shear mixing thereof, and thereafter incorporating from about 20 percent to 100 percent of said total filler requirement into the composition after it has been cooled to a temperature no greater than 175° F. in the cooler, whereby a rigid poly(vinyl chloride) resin powder composition having satisfactory free flow characteristics for application in multi-screw extrusion equipment is produced.

2. The process of claim 1 where the suspension-polymerized poly(vinyl chloride) resin has a relative viscosity ranging from 1.70–3.00, as determined at 25° C., employing a one-percent solution of said resin in cyclohexanone.

3. The process of claim 1 wherein the total filler requirement of the composition is incorporated therein after the composition has been cooled to a temperature of 150° F. or less.

4. The process of claim 1 wherein the remaining portion of filler is incorporated into the composition when it has been cooled to a temperature of 150° F. or less.

5. The process of claim 1 wherein the filler component of the composition has an average particle size of 10 microns or less.

6. The process of claim 5 wherein the filler component of the composition has an average particle size of about 0.1 micron.

7. The process of claim 1 wherein from 25–80 percent of the total filler requirement is incorporated into the composition during the initial mixing cycle.

8. The process of claim 1 wherein the filler component is a calcium carbonate having an average particle size ranging from 1–5 microns.

* * * * *